United States Patent
Kulkarni et al.

(10) Patent No.: US 9,977,726 B2
(45) Date of Patent: May 22, 2018

(54) SYSTEM AND METHOD FOR SMART FRAMEWORK FOR NETWORK BACKUP SOFTWARE DEBUGGING

(71) Applicant: EMC IP Holding Company LLC, Hopkinton, MA (US)

(72) Inventors: Gururaj Kulkarni, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 97 days.

(21) Appl. No.: 14/968,773

(22) Filed: Dec. 14, 2015

(65) Prior Publication Data
US 2016/0098343 A1    Apr. 7, 2016

Related U.S. Application Data

(63) Continuation of application No. 14/137,774, filed on Dec. 20, 2013, now Pat. No. 9,244,811.

(51) Int. Cl.
*G06F 11/00* (2006.01)
*G06F 11/36* (2006.01)
*G06F 11/07* (2006.01)

(52) U.S. Cl.
CPC ...... *G06F 11/3636* (2013.01); *G06F 11/0709* (2013.01); *G06F 11/0766* (2013.01); *G06F 11/0769* (2013.01); *G06F 11/0775* (2013.01); *G06F 11/362* (2013.01); *G06F 11/3664* (2013.01)

(58) Field of Classification Search
CPC ............. G06F 11/0766; G06F 11/0769; G06F 11/0775; G06F 11/362; G06F 11/0709; G06F 11/0781; G06F 11/0787; G06F 11/3636; G06F 11/3664
See application file for complete search history.

(56) References Cited

U.S. PATENT DOCUMENTS

| | | | | |
|---|---|---|---|---|
| 6,035,412 A | * | 3/2000 | Tamer | G06F 11/1466 707/999.202 |
| 9,165,001 B1 | * | 10/2015 | Upadhyay | G06F 17/30079 |
| 2003/0155415 A1 | * | 8/2003 | Markham | G06Q 50/00 235/376 |
| 2005/0015667 A1 | * | 1/2005 | Aaron | G06F 11/0709 714/25 |
| 2006/0048004 A1 | * | 3/2006 | Kawashima | G03G 15/5075 714/23 |
| 2006/0174165 A1 | * | 8/2006 | Shaffer | G06F 11/3476 714/38.13 |
| 2006/0294423 A1 | * | 12/2006 | Shankar | G06F 11/366 714/20 |
| 2007/0164846 A1 | * | 7/2007 | Pedolsky | G06F 21/34 340/5.2 |

(Continued)

*Primary Examiner* — Joshua P Lottich
(74) *Attorney, Agent, or Firm* — Van Pelt, Yi & James LLP

(57) ABSTRACT

A system for network software debugging comprises a processor, an input interface, and an output interface. The processor is configured to determine a set of available components of a selected component type, and determine a set of backup processes running on the component. The input interface is configured to receive a selection of a backup process of the set of backup processes. The output interface is configured to provide an indication of a change of verbosity level.

14 Claims, 9 Drawing Sheets

(56) References Cited

U.S. PATENT DOCUMENTS

| | | | |
|---|---|---|---|
| 2008/0148239 A1* | 6/2008 | Petrov | G06F 11/3636 717/128 |
| 2009/0089761 A1* | 4/2009 | Lazzaro | G06F 11/3664 717/128 |
| 2009/0106741 A1* | 4/2009 | Dageville | G06F 11/3636 717/128 |
| 2009/0133041 A1* | 5/2009 | Rahman | G06F 11/0709 719/318 |
| 2009/0319621 A1* | 12/2009 | Barsness | G06F 11/0724 709/206 |
| 2011/0320884 A1* | 12/2011 | Thilagar | G06F 11/0709 714/48 |
| 2012/0072394 A1* | 3/2012 | Joshi | G06F 17/30368 707/640 |
| 2012/0137181 A1* | 5/2012 | Thompson | G06F 11/0787 714/48 |
| 2012/0215907 A1* | 8/2012 | Chung | G06F 21/552 709/224 |
| 2013/0014088 A1* | 1/2013 | Park | G06F 11/3636 717/128 |
| 2013/0171960 A1* | 7/2013 | Kandregula | G06F 11/3013 455/405 |
| 2014/0007119 A1* | 1/2014 | Liu | G06F 9/54 718/102 |
| 2014/0149576 A1* | 5/2014 | Pavlov | G06F 11/302 709/224 |
| 2014/0282418 A1* | 9/2014 | Wood | G06F 11/3636 717/125 |

* cited by examiner

SYSTEM AND METHOD FOR SMART FRAMEWORK FOR NETWORK BACKUP SOFTWARE DEBUGGING

CROSS REFERENCE TO OTHER APPLICATIONS

This application is a continuation of co-pending U.S. patent application Ser. No. 14/137,774, entitled SYSTEM AND METHOD FOR SMART FRAMEWORK FOR NETWORK BACKUP SOFTWARE DEBUGGING filed Dec. 20, 2013 which is incorporated herein by reference for all purposes

BACKGROUND OF THE INVENTION

Typically, networked backup software has a command line utility enabling logging of extended debug information for backup software processes. Whenever abnormal issues occur, such as crash, core or hang issues, logging of extended debug information can be enabled on suspicious or related process to get more information. This requires human intervention and is ad-hoc in nature. A user or backup administrator who would like to troubleshoot the backup application related issues has to login to the machine having issues and start the utility for a process he would like to debug. If there are many components spread across different machines with many processes to debug, the user needs to login to each component and start the utility for each process.

BRIEF DESCRIPTION OF THE DRAWINGS

Various embodiments of the invention are disclosed in the following detailed description and the accompanying drawings.

DETAILED DESCRIPTION

Figure 1:
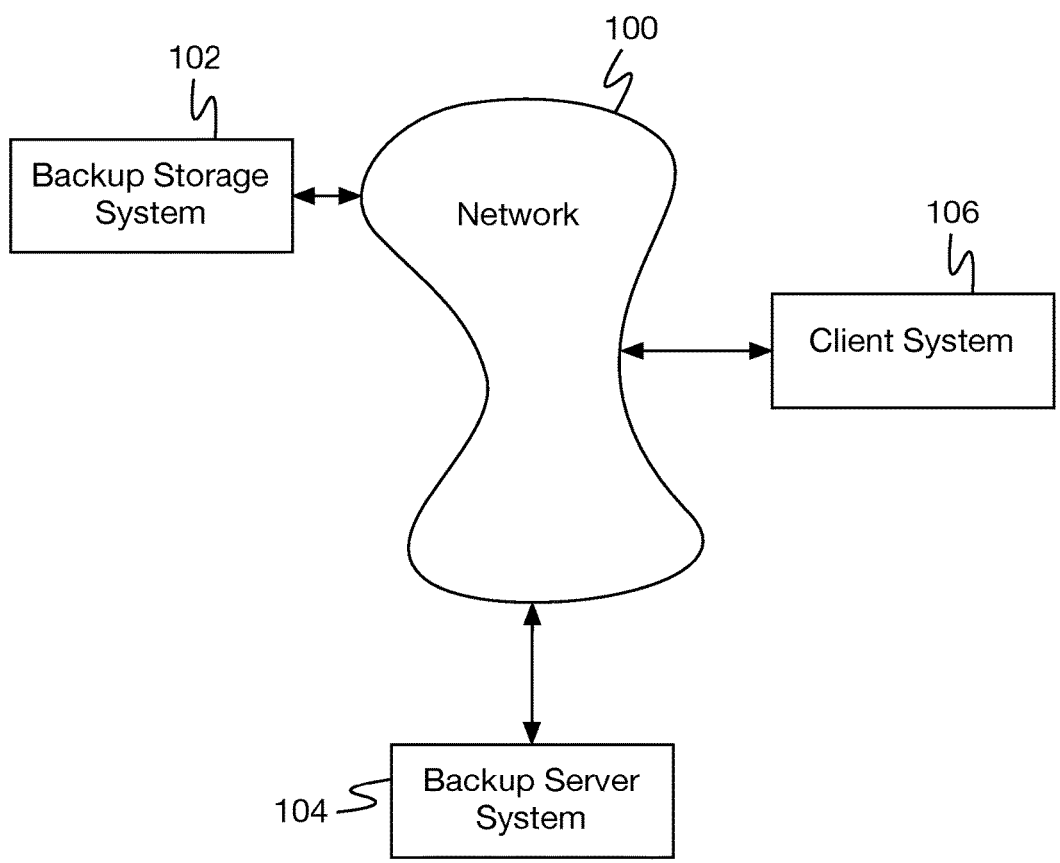
FIG. 1 is a block diagram illustrating an embodiment of a system for network backup software debugging.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for network backup software debugging is disclosed. The system for network software debugging comprises a processor configured to determine a set of available components of a selected component type, and determine a set of backup processes running on the component. The system for network software debugging additionally comprises an input interface configured to receive a selection of a backup process of the set of backup processes, and an output interface configured to provide an indication of a change of verbosity level. The system for network debugging additionally comprises a memory coupled to the processor and configured to provide the processor with instructions.

The system for network debugging comprises a system for automation of the logging of debugging information. The system comprises a user interface for a network administrator enabling the network administrator to select a machine of interest and a process of interest running on the machine, and schedule logging of debugging messages of a desired verbosity for the process. The network administrator may enter in a start time for the logging, or allow a default start time to be used (e.g., immediately). The network administrator may enter a stop time for the logging, or allow a default time to be used (e.g., one hour from the start time). When the logging is complete, the log is transferred from the selected machine to the network administrator machine. Data from the log can then be provided for display.

FIG. 1 is a block diagram illustrating an embodiment of a system for network backup software debugging. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, client system 106 comprises a client system (e.g., a computing system for operation by a user). In some embodiments, client system 106 comprises a system accessed by a user directly (e.g., the user is in proximity with client system 106). In some embodiments, client system 106 comprises a system accessed by a user remotely (e.g., the user is not in proximity with client system 106, and accesses client system 106 via network 100 and a separate user system). Client system 106 comprises a system running enterprise software (e.g., business software for creating data, storing data, transmitting data, receiving data, etc.). In some embodiments, client system 106 comprises a system for storing data on a backup system or retrieving stored data from a backup system. In various embodiments, there are 1, 4, 17, 22, 1459, or any other appropriate number of client systems communicating with network 100. Backup storage system 102 comprises a computer system for backing up data. Backup system 102 backs up data stored on client system 106. In various embodiments, backup system 102 performs full backups of the data on client system 106 (e.g., makes complete copies of the data), performs incremental backups of the data on client system 106 (e.g., makes copies of data modified since the last backup), performs a combination of full and incremental backups of the data on client system 106, or performs any other appropriate kind of backup. In some embodiments, data stored on backup system 102 comprises deduplicated backup data (e.g., data is stored in such a way that multiple copies of the same data are only stored a single time). In some embodiments, deduplicated backup data is segmented (e.g., broken into chunks which can then be compared to determine duplicate data). In some embodiments, deduplicated backup data is segmented using a hash function (e.g., a hash function is used to determine where to divide data into segments). In various embodiments, there are 1, 2, 7, 12, 45, 138, or any other appropriate number of backup storage systems communicating with network 100. Backup server system 104 comprises a server system for controlling backup storage system 102 and client system 106.

Figure 2A:
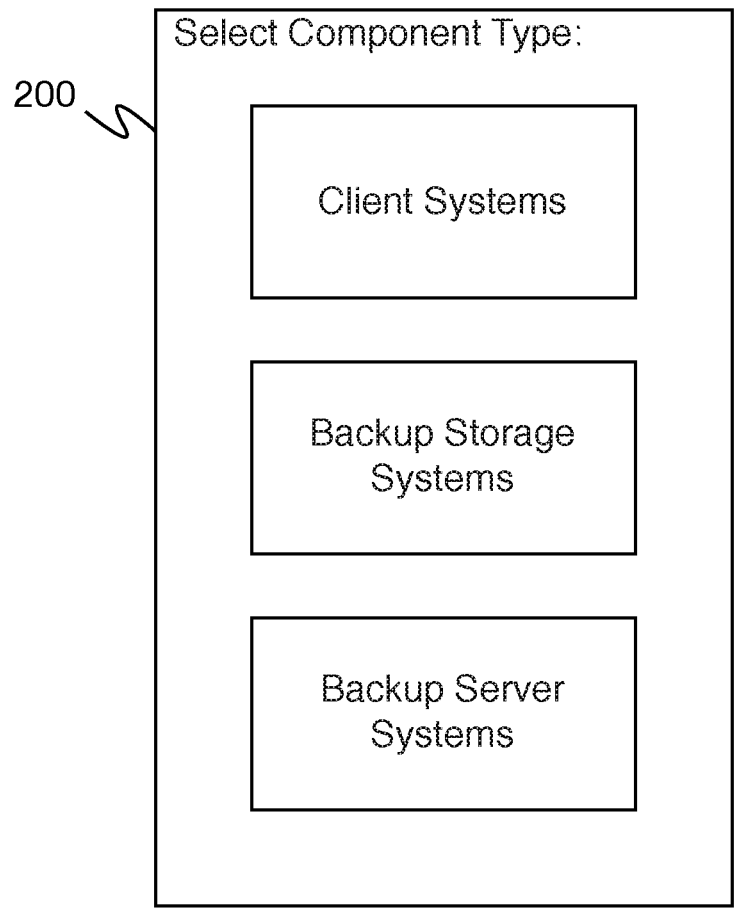
FIG. 2A is a diagram illustrating an embodiment of a user interface for a system for network backup software debugging.

FIG. 2A is a diagram illustrating an embodiment of a user interface for a system for network backup software debugging. In some embodiments, user interface 200 is running on a backup server system (e.g., backup server system 104 of FIG. 1). In some embodiments, user interface 200 is operated by a system administrator. In the example shown, user interface 200 comprises an interface for selecting a component type. In some embodiments, user interface 200 comprises an interface for selecting a component type as part of a process for network backup software debugging. A system administrator can use user interface 200 to select a component type (e.g., client systems, backup storage systems, or backup server systems) to begin a process for network backup software debugging. In some embodiments, when a component type is selected, a set of available components of the component type is displayed.

Figure 2B:
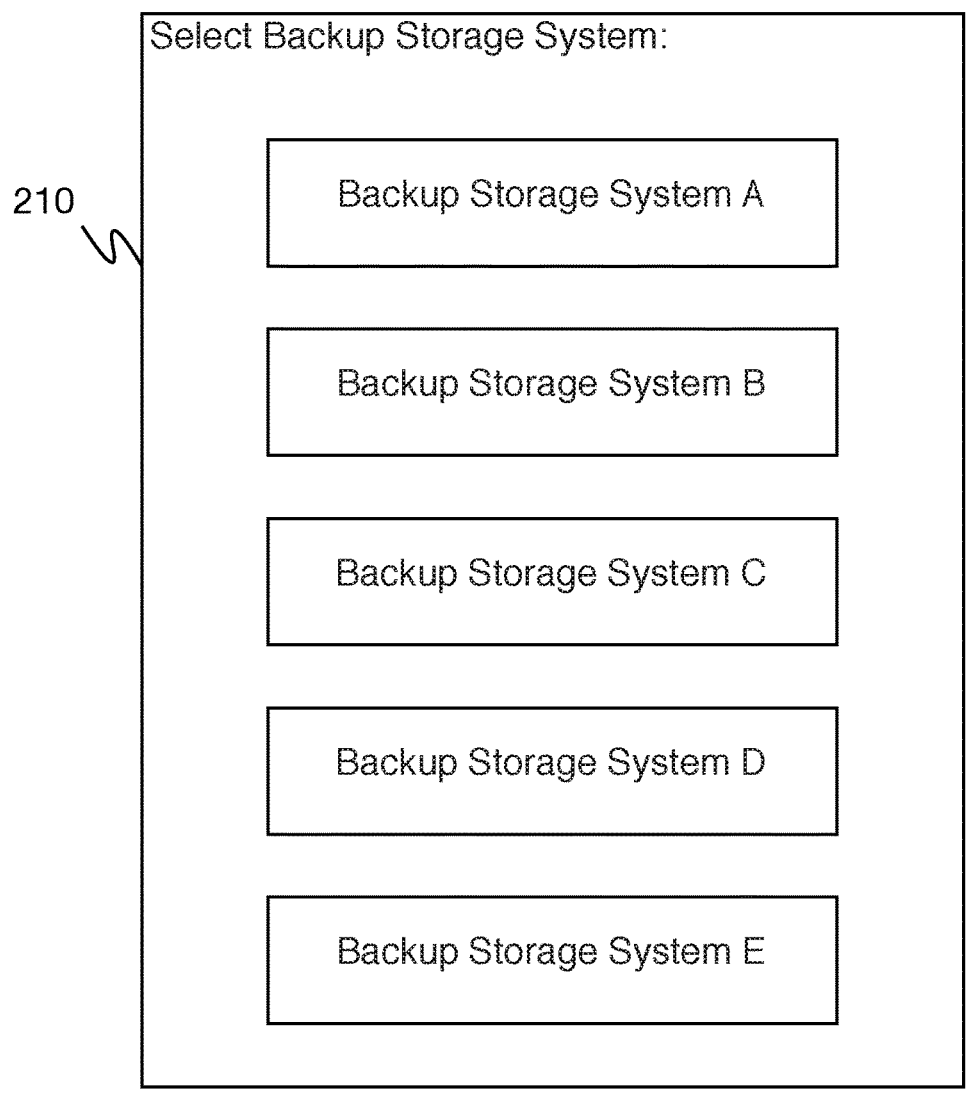
FIG. 2B is a diagram illustrating an embodiment of a user interface for a system for network backup software debugging.

FIG. 2B is a diagram illustrating an embodiment of a user interface for a system for network backup software debugging. In some embodiments, user interface 210 is running on a backup server system (e.g., backup server system 104 of FIG. 1). In some embodiments, user interface 210 is operated by a system administrator. In the example shown, user interface 210 comprises an interface for selecting a component from a set of available components. In some embodiments, the set of available components comprises the set of available components of a previously selected type (e.g., of the type selected using user interface 200 of FIG. 2A). A system administrator can use user interface 210 to select a component (e.g., backup storage system A, backup storage system B, backup storage system C, backup storage system D, backup storage system E, etc.) to continue a process for network backup software debugging. In some embodiments, when a component is selected, a set of backup processes is displayed.

Figure 2C:
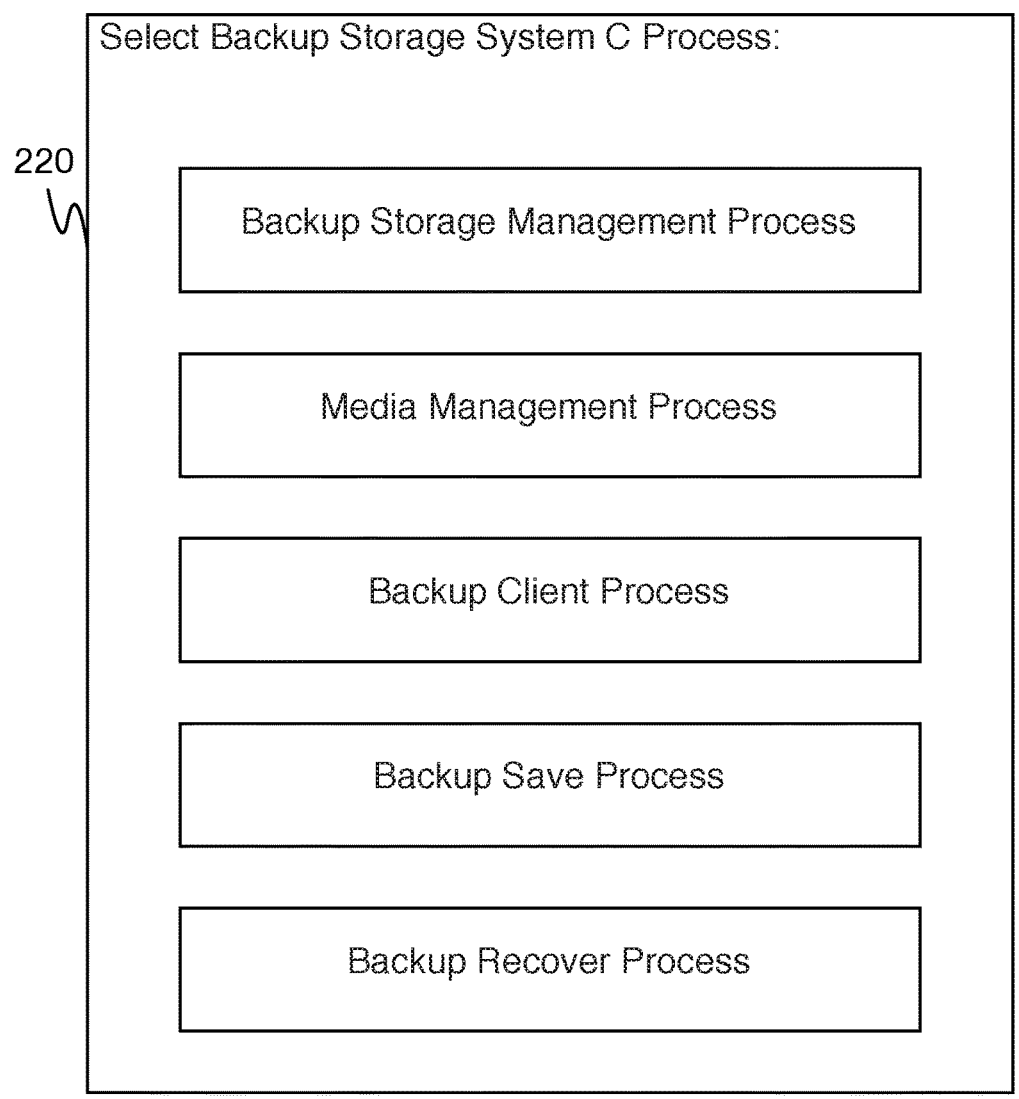
FIG. 2C is a diagram illustrating an embodiment of a user interface for a system for network backup software debugging.

FIG. 2C is a diagram illustrating an embodiment of a user interface for a system for network backup software debugging. In some embodiments, user interface 220 is running on a backup server system (e.g., backup server system 104 of FIG. 1). In some embodiments, user interface 220 is operated by a system administrator. In the example shown, user interface 220 comprises an interface for selecting a backup process from a set of backup processes. In some embodiments, the set of backup processes comprises the set of backup processes running on a previously selected component (e.g., backup processes running on the component selected using user interface 210 of FIG. 2B). A system administrator can use user interface 220 to select a backup process (e.g., a backup storage management process, a media management process, a backup client process, a backup save process, a backup recover process, etc.) to continue a process for network backup software debugging. In some embodiments, when a backup process is selected, a user interface for selecting a verbosity level, start time, and stop time is displayed.

Figure 2D:
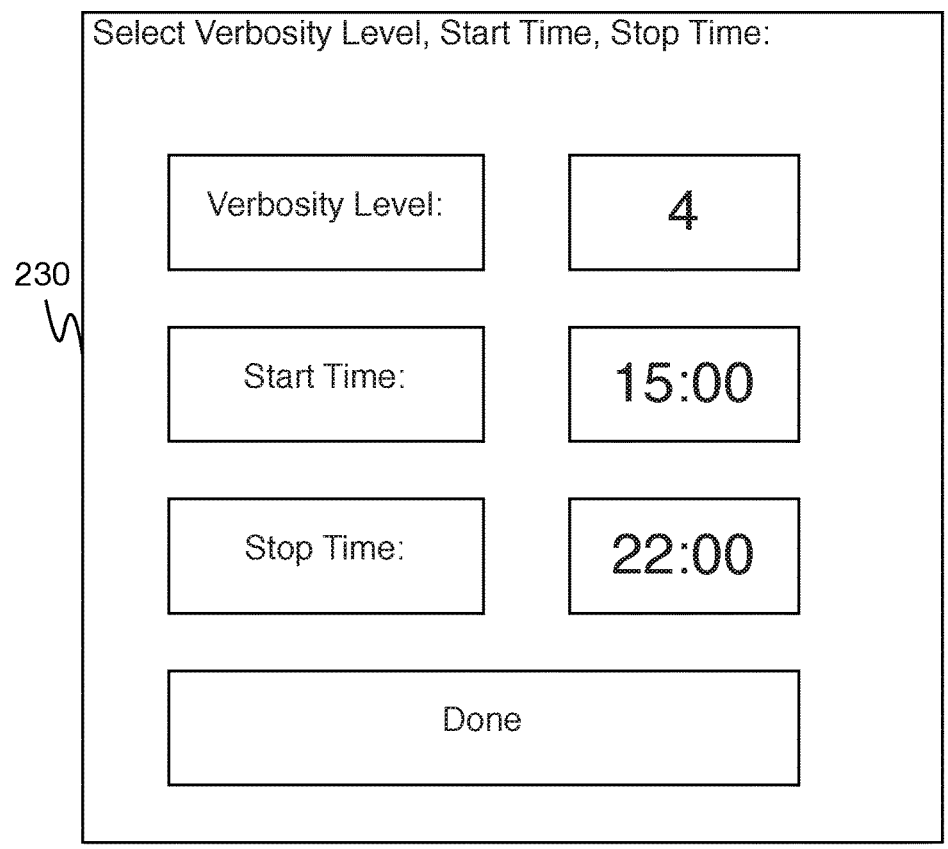
FIG. 2D is a diagram illustrating an embodiment of a user interface for a system for network backup software debugging.

FIG. 2D is a diagram illustrating an embodiment of a user interface for a system for network backup software debugging. In some embodiments, user interface 230 is running on a backup server system (e.g., backup server system 104 of FIG. 1). In some embodiments, user interface 230 is operated by a system administrator. In the example shown, user interface 230 comprises an interface for selecting a verbosity level, start time, and stop time. In some embodiments, a verbosity level comprises a verbosity level of debugging messages for a process. In some embodiments, a start time comprises a start time for logging debugging messages for a process. In some embodiments, if a start time is not entered, a default start time is determined (e.g., immediately, in one hour, at midnight, etc.). In some embodiments, a stop time comprises a stop time for logging debugging messages for a process. In some embodiments, if a stop time is not entered, a default stop time is determined (e.g., one hour from the start time, one day from the start time, at 6 AM, etc.). In some embodiments, when a verbosity level, start time, and stop time have been selected, scheduling of network backup software debugging is complete. In some embodiments, after the network backup software debugging process has finished (e.g., after the stop time), a debugging message log is received by the backup server system. In some embodiments, data from the log is provided for display.

Figure 3:
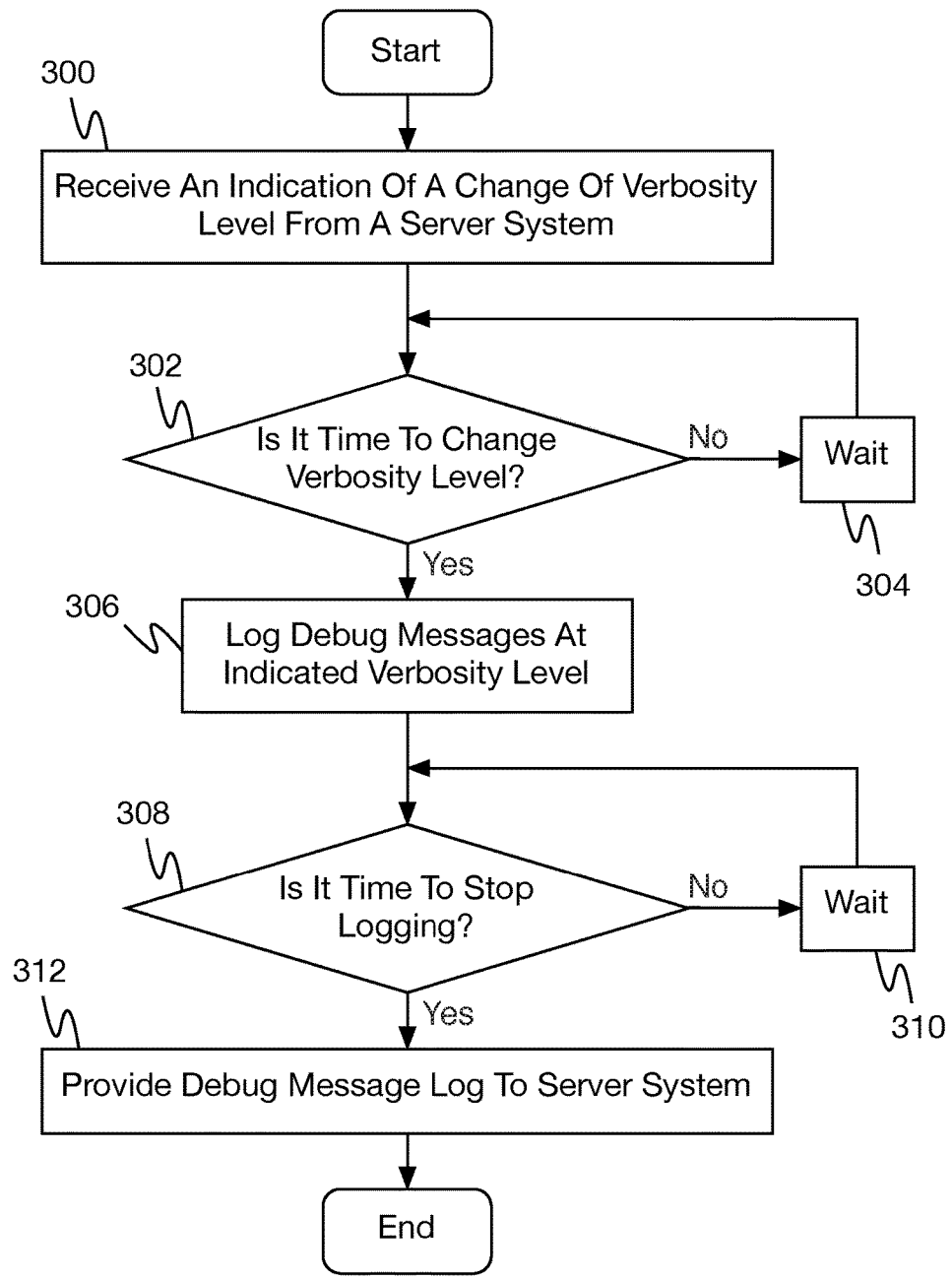
FIG. 3 is a flow diagram illustrating an embodiment of a process for logging debugging messages.

FIG. 3 is a flow diagram illustrating an embodiment of a process for logging debugging messages. In some embodiments, the process of FIG. 3 is executed by a client system (e.g., client system 106 of FIG. 1). In the example shown, in 300, an indication of a change of verbosity level is received from a server system (e.g., backup server system 104 of FIG. 1). In some embodiments, the indication of a change of verbosity level comprises an indication of a new verbosity level (e.g., level 2, level 5, etc.). In some embodiments, the indication of a change of verbosity level comprises a start time (e.g., when the verbosity level should change). In some embodiments, the indication of a change of verbosity level comprises a stop time (e.g., when the verbosity level should change back). In some embodiments, an indication of a change of verbosity level comprises a process (e.g., a process to change the verbosity level for). In some embodiments, the indication of a change of verbosity level comprises an indication to log debug messages. In 302, it is determined if it is time to change the verbosity level (e.g., if it is the start time). If it is determined in 302 that it is not the start time, control passes to 304. In 304, the process waits.

In various embodiments, the process waits 1 millisecond, 500 milliseconds, 10 seconds, 2 minutes, or any other appropriate period of time. Control then passes to 302. If it is determined in 302 that it is the start time, control passes to 306. In 306, debug messages are logged at the indicated verbosity level. In some embodiments, logging debug messages comprises storing debug messages generated by the process being logged in a log file. In some embodiments, debug messages comprise an associated importance value, and only messages with an importance value greater than or equal to a threshold importance value are stored in a log file. In some embodiments, the threshold importance value is determined by computing a function of the verbosity level (e.g., the threshold importance value is equal to the verbosity level, the threshold importance value is equal to ten minus the verbosity level, etc.). In 308, it is determined whether it is time to stop logging (e.g., if it is the stop time. If it is determined in 308 that it is not time to stop logging, control passes to 310. In 310, the process waits. In various embodiments, the process waits 1 millisecond, 500 milliseconds, 10 seconds, 2 minutes, or any other appropriate period of time. Control then passes to 308. If it is determined in 310 that it is time to stop logging, control passes to 312. In 312, the debug message log is provided to the server system. In some embodiments, an indication is provided to the server system that logging is complete. In some embodiments, the debug message log is provided to the server system in response to a request for the debug message log.

Figure 4:
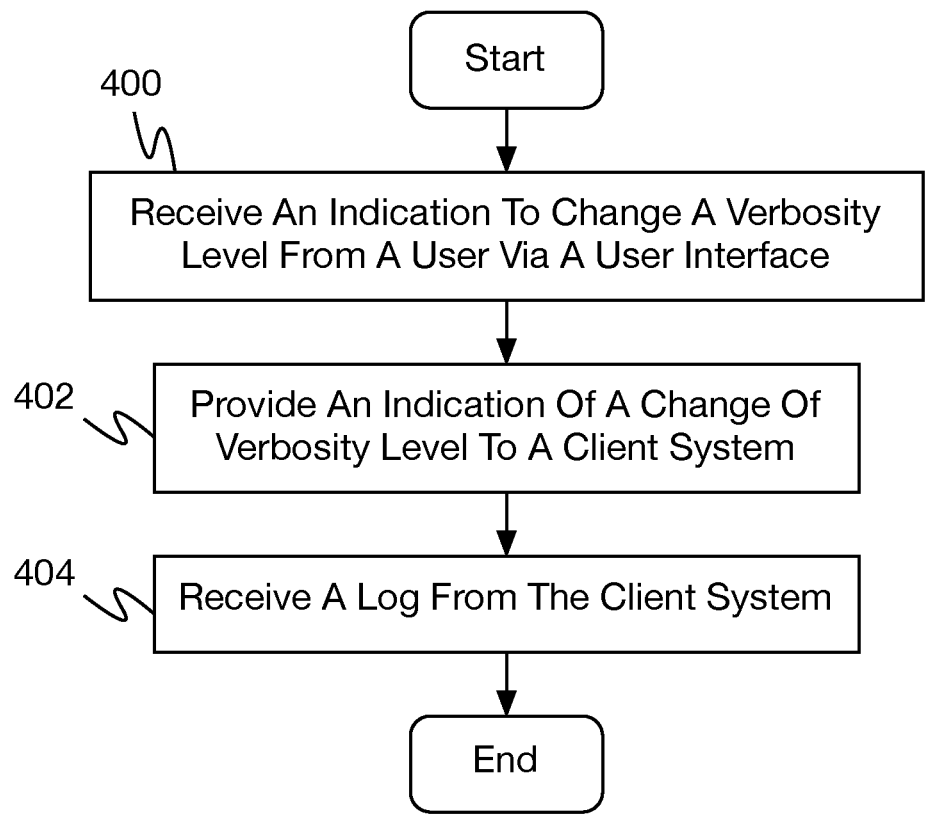
FIG. 4 is a flow diagram illustrating an embodiment of a process for network backup software debugging.

FIG. 4 is a flow diagram illustrating an embodiment of a process for network backup software debugging. In some embodiments, the process of FIG. 4 is executed by a backup server system (e.g., backup server system 104 of FIG. 1). In the example shown, in 400, an indication is received from a user via a user interface to change a verbosity level. In some embodiments, the user comprises a system administrator. In some embodiments, the user interface comprises the user interface shown in FIGS. 2A, 2B, 2C, and 2D. In 402, the indication of a change of verbosity level is provided to a client system. In 404, a log is received from the client system. In some embodiments, an indication that logging is complete is received from the client system. In some embodiments, the backup server system requests the log from the client system, and receives the log in response to the request.

Figure 5A:
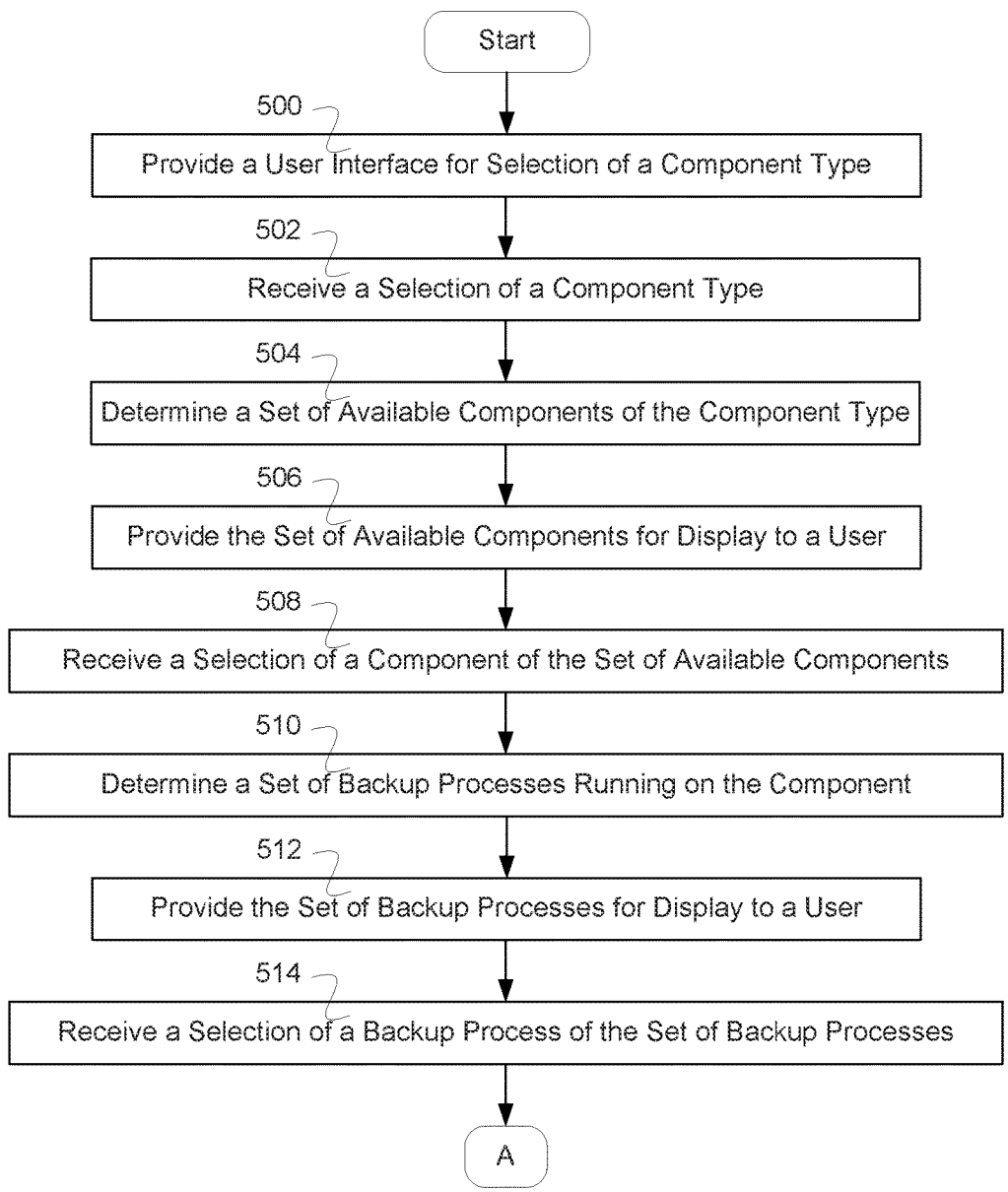
FIGS. 5A and 5B are flow diagrams illustrating an embodiment of a process for receiving an indication to change a verbosity level via a user interface.
Figure 5B:
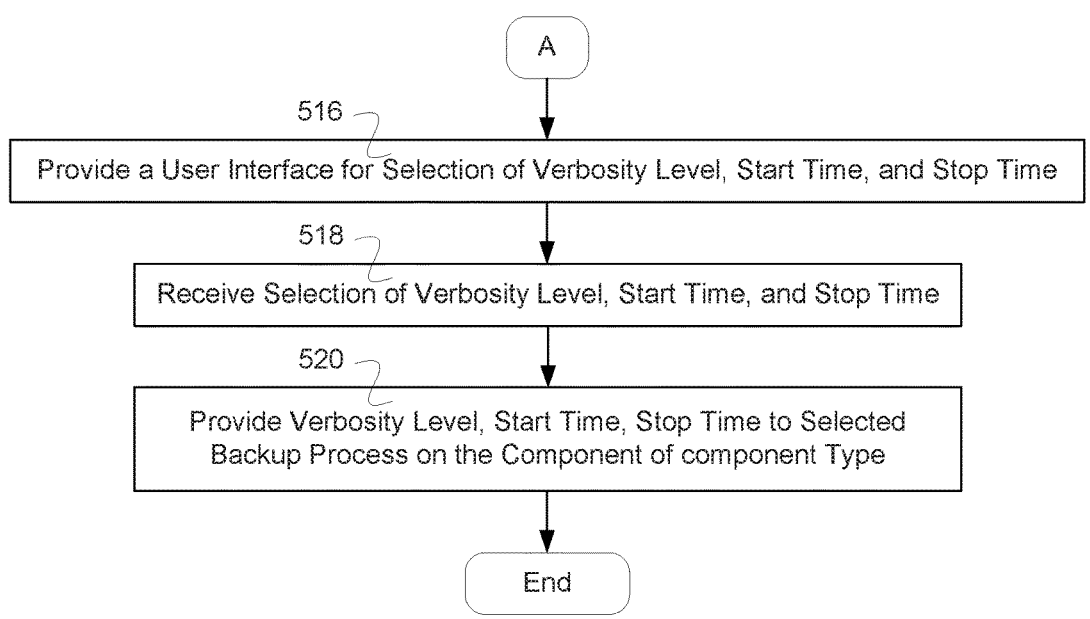

FIGS. 5A and 5B are flow diagrams illustrating an embodiment of a process for receiving an indication to change a verbosity level via a user interface. In some embodiments, the process of FIG. 5 implements 400 of FIG. 4. In the example shown, in 500, a user interface for selection of a component type is provided. In some embodiments, the user interface comprises user interface 200 of FIG. 2A. In 502, a selection of a component type is received. In 504, a set of available components of the component type is determined. In various embodiments, a set of available components of the component type is determined by querying a network, by checking a stored list of components, or in any other appropriate way. In 506, the set of available components is provided for display to a user (e.g., via user interface 210 of FIG. 2B). In 508, a selection of a component of the set of available components is received. In 510, a set of backup processes running on the component is determined. In some embodiments, a set of backup processes running on the component is determined by querying the component. In 512, the set of backup processes is provided for display to a user (e.g., via user interface 220 of FIG. 2C). In 514, a selection of a backup process of the set of backup processes is received.

In 516, the user is provided with an interface for selection of a verbosity level, a start time, and a stop time. In 518, a selection is received of verbosity level, start time, and stop time. In 520, the verbosity level, the start time, and the stop time are provided to the selected backup process on the component of component type.

In some embodiments, the verbosity level, start time, and stop time are received from a user and provided to a connected system. In some embodiments, the verbosity level is changed at a start time and a stop time by providing instructions to a connected system (e.g., a set of backup processes that has been selected for a change of verbosity level). In some embodiments, the verbosity level change is achieved using a single instruction that is translated to a start and a stop instruction on a connected system. In some embodiments, the verbosity level is explicitly changed from a server system by individual instructions to change a verbosity level at each of a start time and a stop time separately.

In various embodiments, a backup process (e.g., a backup process of the set of backup processes determined in 510) comprises a network backup system client process, a network backup system save process, a network backup system recover process, a network backup system media management daemon, a network backup system storage management daemon, a network backup system server master process, a network backup system server process for media database management, a network backup system server process for spawning and monitoring jobs, a network backup system server process for providing client file index management services, a network backup system server process for managing media library operations, a network backup system audit log process, or any other appropriate backup process.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for logging debugging messages, comprising:
an input interface configured to receive an indication of a change of verbosity level, wherein the indication comprises a start time;
a processor configured to:
store in a log file debug messages having an importance value associated with the indication; and
an output interface configured to provide the log file to a backup server.

2. The system of claim 1, wherein the processor is further configured to wait until the start time to store the debug messages in the log file.

3. The system of claim 1, wherein the indication comprises a process.

4. A system for logging debugging messages, comprising:
an input interface configured to receive an indication of a change of verbosity level, wherein the indication comprises a stop time;
a processor configured to:
store in a log file debug messages having an importance value associated with the indication; and
an output interface configured to provide the log file to a backup server.

5. The system of claim 4, wherein the processor is further configured to store the debug messages in the log file until the stop time.

6. A system for logging debugging messages, comprising:
an input interface configured to receive an indication of a change of verbosity level;
a processor configured to:
 store in a log file debug messages having an importance value associated with the indication, wherein the debug messages are stored in the log file in the event the importance value is greater than a threshold importance value, wherein the threshold importance value is based on a function of the verbosity level;
an output interface configured to provide the log file to a backup server.

7. A system for logging debugging messages, comprising:
an input interface configured to receive an indication of a change of verbosity level;
a processor configured to:
 store in a log file debug messages having an importance value associated with the indication;
provide a completion indication to a backup server
an output interface configured to provide the log file to the backup server.

8. A system for logging debugging messages, comprising:
an input interface configured to receive an indication of a change of verbosity level;
a processor configured to:
 store in a log file debug messages having an importance value associated with the indication;
an output interface configured to provide the log file to a backup server, wherein the log file is provided to the backup server in response to a request.

9. A method of logging debugging messages, comprising:
receiving an indication of a change of verbosity level, wherein the indication comprises a start time;
storing in a log file debug messages having an importance value associated with the indication; and
providing the log file to a backup server.

10. The method of claim 9, further comprising waiting until the start time to store the debug messages in the log file.

11. A method of logging debugging messages, comprising:
receiving an indication of a change of verbosity level, wherein the indication comprises a stop time;
storing in a log file debug messages having an importance value associated with the indication; and
providing the log file to a backup server.

12. The method of claim 11, further comprising storing the debug messages in the log file until the stop time.

13. A method of logging debugging messages, comprising:
receiving an indication of a change of verbosity level;
storing in a log file debug messages having an importance value associated with the indication, wherein the debug messages are stored in the log file in the event the importance value is greater than a threshold importance value, wherein the threshold importance value is based on a function of the verbosity level; and
providing the log file to a backup server.

14. A computer program product for logging debugging messages, the computer program product being embodied in a non-transitory computer readable storage medium and comprising computer instructions for:
receiving an indication of a change of verbosity level;
storing in a log file debug messages having an importance value associated with the indication, wherein the debug messages are stored in the log file in the event the importance value is greater than a threshold importance value, wherein the threshold importance value is based on a function of the verbosity level; and
providing the log file to a backup server.

* * * * *